Figure 1:
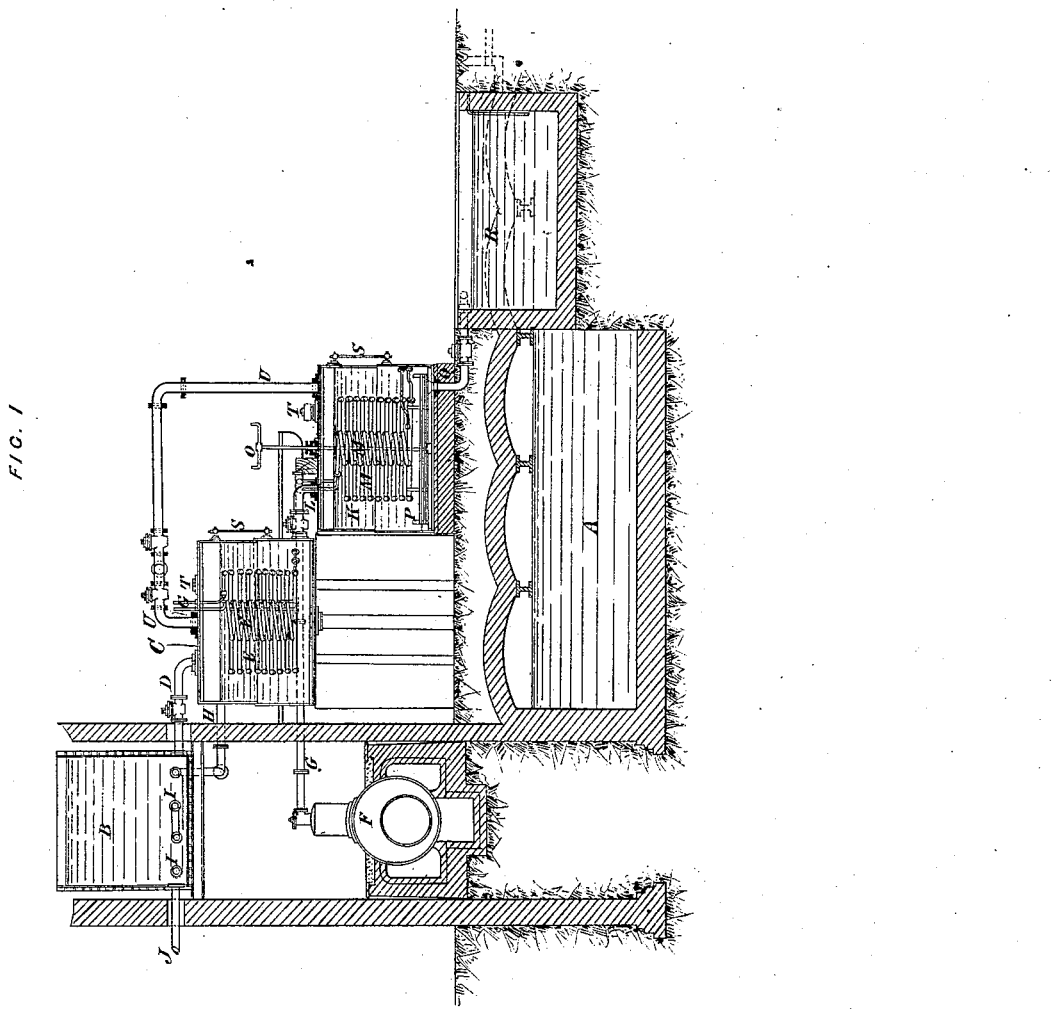

(No Model.)  3 Sheets—Sheet 1.

J. COATES.
APPARATUS FOR THE MANUFACTURE OF SULPHATE OF AMMONIA.

No. 272,651. Patented Feb. 20, 1883.

WITNESSES
J. A. Rutherford
Robert Everett

INVENTOR.
John Coates.
By James L. Norris.
Atty.

(No Model.)  3 Sheets—Sheet 2.

J. COATES.
APPARATUS FOR THE MANUFACTURE OF SULPHATE OF AMMONIA.

No. 272,651. Patented Feb. 20, 1883.

WITNESSES
J. A. Rutherford
Robert Everett

INVENTOR.
John Coates.
By James L. Norris.
Atty.

(No Model.)

J. COATES.
APPARATUS FOR THE MANUFACTURE OF SULPHATE OF AMMONIA.

No. 272,651. Patented Feb. 20, 1883.

3 Sheets—Sheet 3.

WITNESSES
J. A. Rutherford
Robert Everett

INVENTOR.
John Coates.
By James L. Norris
Atty.

UNITED STATES PATENT OFFICE.

JOHN COATES, OF LONDON, ENGLAND.

APPARATUS FOR THE MANUFACTURE OF SULPHATE OF AMMONIA.

SPECIFICATION forming part of Letters Patent No. 272,651, dated February 20, 1883.

Application filed October 9, 1882. (No model.) Patented in England July 7, 1882, No. 3,214, and in France July 8, 1882, No. 137,838.

*To all whom it may concern:*

Be it known that I, JOHN COATES, of London, England, have invented new and useful Improvements in Apparatus used for the Manufacture of Sulphate of Ammonia, (for which I have made an application for a patent in Great Britain, No. 3,214, bearing date July 7, 1882, and an application for a patent in France, No. 137,838, bearing date July 8, 1882,) of which the following is a specification, reference being had to the accompanying drawings.

This invention has reference to the manufacture of sulphate of ammonia from ordinary gas-liquor, and has for its object the construction of apparatus whereby the whole of the ammonia may be extracted from such liquor without nuisance to the neighborhood or danger to the workmen, and, what is of still greater importance commercially, with a capability to produce a very white sulphate when brown or pyrites acid is used, thus dispensing with the necessity for the use of a purer, and therefore more costly, acid.

Figure 2:
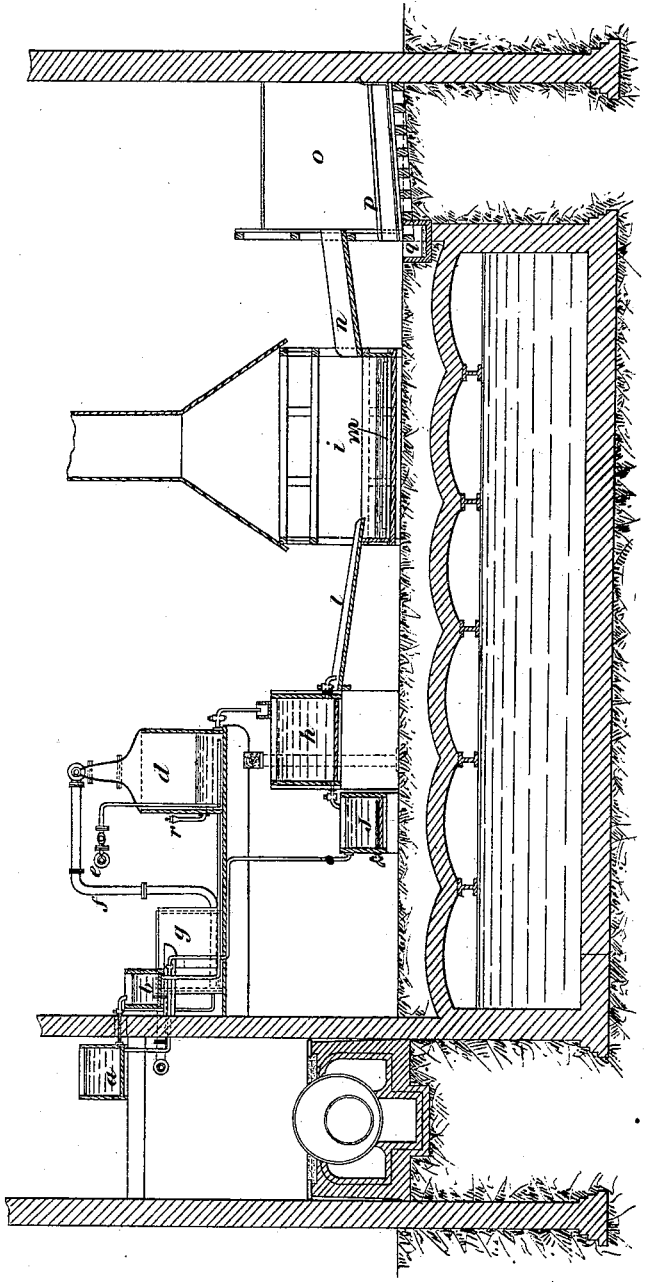
Figure 3:
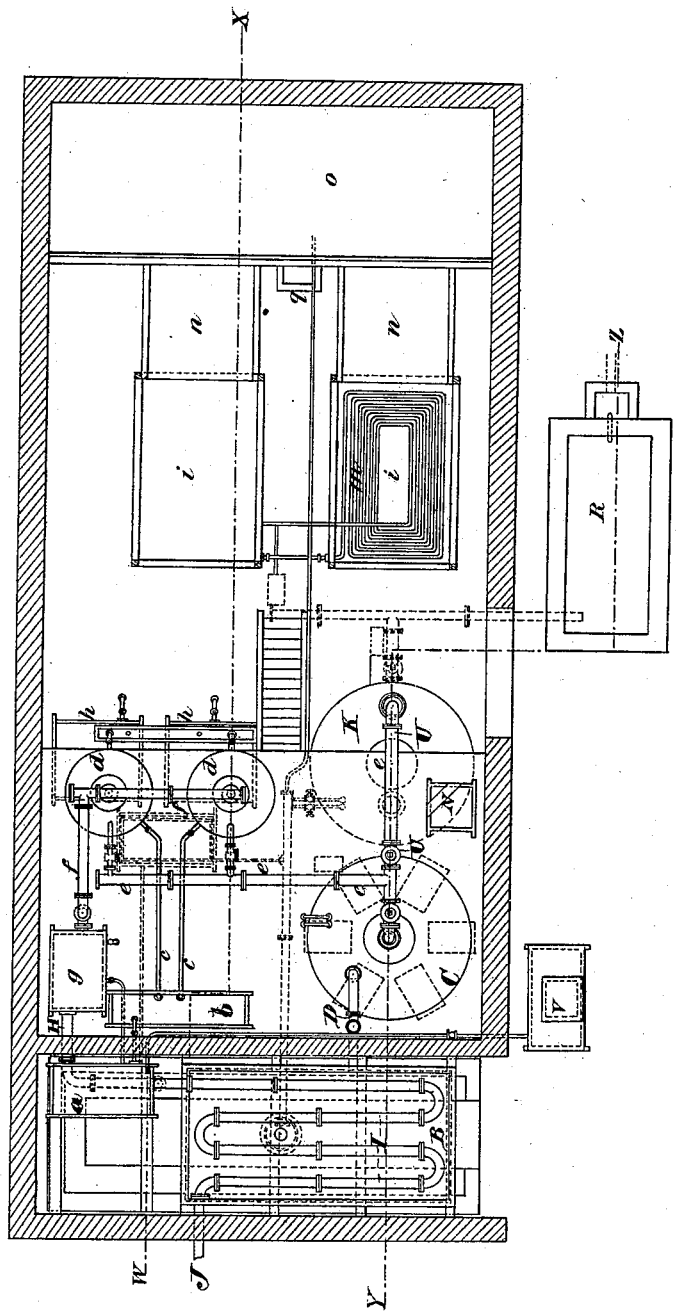

The invention consists in the construction of apparatus depicted in the drawings attached hereto, and of which the following is a description:

Figure 1 is a vertical sectional elevation through Y Z of Fig. 3. Fig. 2 is a vertical sectional elevation through W X of Fig. 3, and Fig. 3 is a plan of the apparatus.

In each of the views similar letters refer to the same parts.

Referring to Fig. 1, A is a gas-liquor storage-tank capable of holding a month's working.

B is a raised tank, made of cast-iron, into which the liquor is pumped from A, and is sufficiently large to hold two charges of the strong-liquor still C, into which the liquor gravitates through the pipe D till it reaches within about eighteen inches of the top of C.

E E are two coils heated by steam from the boiler F, and conveyed to them by the pipe G.

H is a pipe that leads from the catch-box $g$, Figs. 2 and 3, and carries off the sulphureted-hydrogen gases through the condensing-pipes I, that may be laid in the bottom of the tank B, or exterior thereto, being ultimately led by the pipe J to an oxide-of-iron purifier.

K is the weak-liquor still—that is to say, the still that receives the weak liquor through the pipe L from the still C after the principal part of the ammonia has been liberated from it in that vessel. The still K is also furnished with two wrought-iron steam-pipe coils, M M.

N, Fig. 3, is a slaked-lime box, from which the still K is charged with lime in order to liberate the fixed ammonia.

O is a handle fixed to a spindle that passes through the top of the still K, and terminates in arms P, by the turning of which the lime mixture may be agitated with the contents of the still.

Q is a sludge pipe and cock, through which the mixture, after parting with its ammonia, may be run into the spent-lime or settling tank R, made of brick. The stills are made of wrought-iron plates, arranged for a working pressure of eight pounds to the square inch, and are fitted with gage-glasses S S to indicate the level of the liquor, test-cocks to ascertain its strength, safety-valves T T to relieve any excess of pressure, vacuum-cocks for use in running off the stills, man-holes for access to the interior, mud-holes for cleaning purposes, liquor inlet and outlet cocks, steam-inlet cocks to the coils, with waste-water outlet-pipes and self-acting water-traps; also, the necessary vapor-outlet pipes and cocks U U. The size of the still may be such as will hold about two thousand two hundred gallons, but is not confined to any particular capacity.

Referring now more particularly to Figs. 2 and 3, V is the acid store tank, from which the acid is raised by means of a Körting's blower to a closed and elevated acid-tank, $a$. From thence the acid runs into a diluting-tank, $b$. A pipe, $c$, is used to convey the dilute acid to the saturators $d\ d$, which are fitted with lead test-plugs $r$. The vapor is conducted from the stills to the saturators by means of cast-iron pipes $e\ e$, each terminating in a lead pipe carried through the top of the saturators, and forming into a single coil at the bottom. These coils have a series of small perforations, so that the vapor is split up into numerous jets.

$f$ is a cast-iron pipe to carry off the sulphureted-hydrogen vapors, carbonic acid, and uncondensed steam to the catch-box $g$, which is charged with acid in order to intercept any ammonia that may have passed over with the vapors just mentioned. The pipe $f$ may, however, before reaching the catch-box, be passed through the strong-liquor still C, so that the hot gases within it may help to heat the contents of the still.

$h\ h$ are settling-tanks, placed between the saturators and evaporating-pans $i\ i$. The settlings are drawn off from the settling-tanks to the boiling-up tank $j$, where they are diluted with water and acted upon by steam to free any solution of sulphate they may contain.

$i\ i$ are evaporating-pans, into which the solution from the settling-tanks is run by a movable spout, $l$, and concentrated by the application of steam passing through lead pipes $m$ at the bottom of the pan.

$n\ n$ are draining-tables, onto which the crystals formed in the evaporating-pans are placed by means of a wooden shovel, the said tables being laid at an angle, so that the drippings may run back into the pan. When sufficiently dry the crystals may be removed to the store $o$. The flooring of this store is so laid that any drippings from the sulphate will fall through onto a false floor, $p$, covered entirely with sheet-lead, and so that the drippings from the sulphate gravitate into the liquor-well $q$, and are there recovered and put back into the evaporating-pan.

It will be observed that most of the apparatus is made, as shown, in duplicate, so that they may be used alternately and the manufacture be constant and continuous.

Having now described and particularly set forth the nature of this invention, I wish it to be understood that what I claim as my invention is—

1. The combination, with the stills C and K, of the saturators $d\ d$, into which the vapor from the stills is conducted through pipes $e$, and the acid-tanks for supplying dilute acid to the saturators, substantially as described.

2. The apparatus for manufacturing sulphate of ammonia, comprising the two stills provided with coils of steam-pipe, the saturators $d$, connected with the stills and with an acid-tank, the settling-tanks $h$, located between the saturators and evaporating-pans $i$, and means for drawing off the settlings from the settling-tanks to a boiling-up tank, $j$, in which the settlings are diluted with water and acted upon by steam to free the solution of any remaining sulphate, said members being constructed and arranged substantially as described.

JOHN COATES.

Witnesses:
W. H. BENNETT,
S. K. BENNETT.